US007529617B2

(12) United States Patent
Ono et al.

(10) Patent No.: US 7,529,617 B2
(45) Date of Patent: May 5, 2009

(54) AREA INFORMATION PROVISION SYSTEM AND METHOD

(75) Inventors: Takashi Ono, Kobe (JP); Shingo Fujimoto, Kobe (JP); Jun Kakuta, Kobe (JP); Masahiko Murakami, Kobe (JP); Sumiyo Okada, Kawasaki (JP); Akinori Iwakawa, Akashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/798,851

(22) Filed: Mar. 12, 2004

(65) Prior Publication Data

US 2005/0080554 A1 Apr. 14, 2005

(30) Foreign Application Priority Data

Mar. 27, 2003 (JP) ............................. 2003-088548

(51) Int. Cl.
*G01C 21/00* (2006.01)
(52) U.S. Cl. ..................... 701/207; 701/200; 701/201; 701/213; 701/25; 340/998; 340/995.12
(58) Field of Classification Search ............... 701/1, 701/200–209, 213, 25; 455/456.1–456.3; 340/988, 995.12
See application file for complete search history.

(56) References Cited

U.S. PATENT DOCUMENTS

| 6,421,606 | B1 * | 7/2002 | Asai et al. ............. 701/209 |
| 6,496,477 | B1 * | 12/2002 | Perkins et al. ............. 370/228 |
| 6,606,494 | B1 * | 8/2003 | Arpee et al. ............. 455/422.1 |
| 6,795,710 | B1 * | 9/2004 | Creemer ............. 455/456.3 |
| 6,834,229 | B2 * | 12/2004 | Rafiah et al. ............. 701/201 |

(Continued)

FOREIGN PATENT DOCUMENTS

EP 1 397 012 3/2004

(Continued)

OTHER PUBLICATIONS

A routing strategy for vehicular ad hoc networks in city environments, Lochert, C.; Hartenstein, H.; Tian, J.; Fussler, H.; Hermann, D.; Mauve, M.; Intelligent Vehicles Symposium, 2003. Proceedings. IEEE, Jun. 9-11, 2003 pp. 156-161 Digital Object Identifier 10.1109/IVS.2003.1212901*

(Continued)

*Primary Examiner*—Cuong H Nguyen
(74) *Attorney, Agent, or Firm*—Hanify & King, P.C.

(57) ABSTRACT

A method and system for providing area information anticipates the user's mode of transportation and destination and provides information specific to the anticipated mode of transportation and destination. The system comprises two information processing devices. The first transmits at least one item of area specific information and, the second receives at least one item of area specific information, wherein the first information processing device stores area specific information and corresponding location information in pairs, infers a mode of user transportation and estimates a destination of the user based on location information of a user of the second device, extracts at least one item of area information specific to the destination of the user, and transmits the at least one item of extracted area information to the second information processing device, and wherein the second information processing device receives the at least one item of area information from the first device.

15 Claims, 15 Drawing Sheets

U.S. PATENT DOCUMENTS

| | | | |
|---|---|---|---|
| 6,901,304 B2* | 5/2005 | Swan et al. ............... 700/115 |
| 6,930,983 B2* | 8/2005 | Perkins et al. ............. 370/252 |
| 7,080,160 B2* | 7/2006 | Cognet et al. .............. 709/248 |
| 7,296,088 B1* | 11/2007 | Padmanabhan et al. ..... 709/238 |
| 2001/0027375 A1* | 10/2001 | Machida et al. ............ 701/209 |
| 2002/0073228 A1* | 6/2002 | Cognet et al. .............. 709/236 |
| 2003/0109266 A1* | 6/2003 | Rafiah et al. ............... 455/456 |
| 2003/0132854 A1* | 7/2003 | Swan et al. ........... 340/825.49 |
| 2003/0132855 A1* | 7/2003 | Swan .................... 340/825.49 |
| 2003/0171939 A1* | 9/2003 | Yagesh et al. ................. 705/1 |
| 2003/0202506 A1* | 10/2003 | Perkins et al. ............. 370/352 |
| 2003/0227392 A1* | 12/2003 | Ebert et al. ........... 340/825.49 |

FOREIGN PATENT DOCUMENTS

| | | |
|---|---|---|
| JP | 11-091570 | 4/1999 |
| JP | 2000-215211 | 8/2000 |
| JP | 2002-041612 | 2/2002 |
| JP | 2002-082982 | 3/2002 |
| JP | 2002-189656 | 7/2002 |
| JP | 2002-304408 | 10/2002 |
| JP | 2003-044503 | 2/2003 |
| JP | 2004-96621 | 3/2004 |

OTHER PUBLICATIONS

Geolocation and wireless multimedia, Djuknic, G.; Wilkus, S.; Multimedia and Expo, 2001. ICME 2001. IEEE International Conference on, Aug. 22-25, 2001 pp. 459-462.*

Positioning information fusion methods, Jianmin Xu; Yue Zeng; Yucong Hu; Intelligent Transportation Systems, 2003. Proceedings. 2003 IEEE, vol. 2, Oct. 12-15, 2003 pp. 1240-1245 vol. 2.*

Location-Aware Services over Vehicular Ad-Hoc Networks using Car-to-Car Communication, Dikaiakos, M.D.; Florides, A.; Nadeem, T.; Iftode, L.; Selected Areas in Communications, IEEE Journal on, vol. 25, Issue 8, Oct. 2007 pp. 1590-1602, Digital Object Identifier 10.1109/JSAC.2007.071008.*

Secure routing for mobile ad hoc networks, Argyroudis, P.G.; O'Mahony, D. Communications Surveys & Tutorials, IEEE vol. 7, Issue 3, Third Quarter 2005 pp. 2-21.*

Mobility-location aided transmission aware MAC enhancements for ad hoc networks, Rajshiva, K.; Qing-An Zeng; Wireless Communications and Networking Conference, 2006. WCNC 2006. IEEE, vol. 2, 0-0 0 pp. 709-714 Digital Object Identifier 10.1109/WCNC.2006.1683555.*

Achieving anonymous location-based services, McDiarmid, A.; Irvine, J.; Vehicular Technology Conference, 2004. VTC2004-Fall. 2004 IEEE 60th, vol. 4, Sep. 26-29, 2004 pp. 2970-2973 vol. 4, Digital Object Identifier 10.1109/VETECF.2004.1400605.*

A routing strategy for vehicular ad hoc networks in city environments, Lochert, C.; Hartenstein, H.; Tian, J.; Fussler, H.; Hermann, D.; Mauve, M.; Intelligent Vehicles Symposium, 2003. Proceedings. IEEE, Jun. 9-11, 2003 pp. 156-161 Digital Object Identifier 10.1109/IVS.2003.1212901.*

Positioning information fusion methods, Jianmin Xu; Yue Zeng; Yucong Hu; Intelligent Transportation Systems, 2003. Proceedings. 2003 IEEE, vol. 2, Oct. 12-15, 2003 pp. 1240-1245 vol. 2.*

Using GPS data to calculate the length and variability of freight vehicle journey times on motorways, Hudson, M.; Rhys-Tyler, G.; Road Transport Information and Control, 2004. RTIC 2004. 12th IEE International Conference on, Apr. 20-22, 2004 pp. 49-55.*

Japanese Patent Application No. 2003-021074; *Notification of Reasons for Refusal*; Oct. 10, 2006; JP Application with English Translation.

* cited by examiner

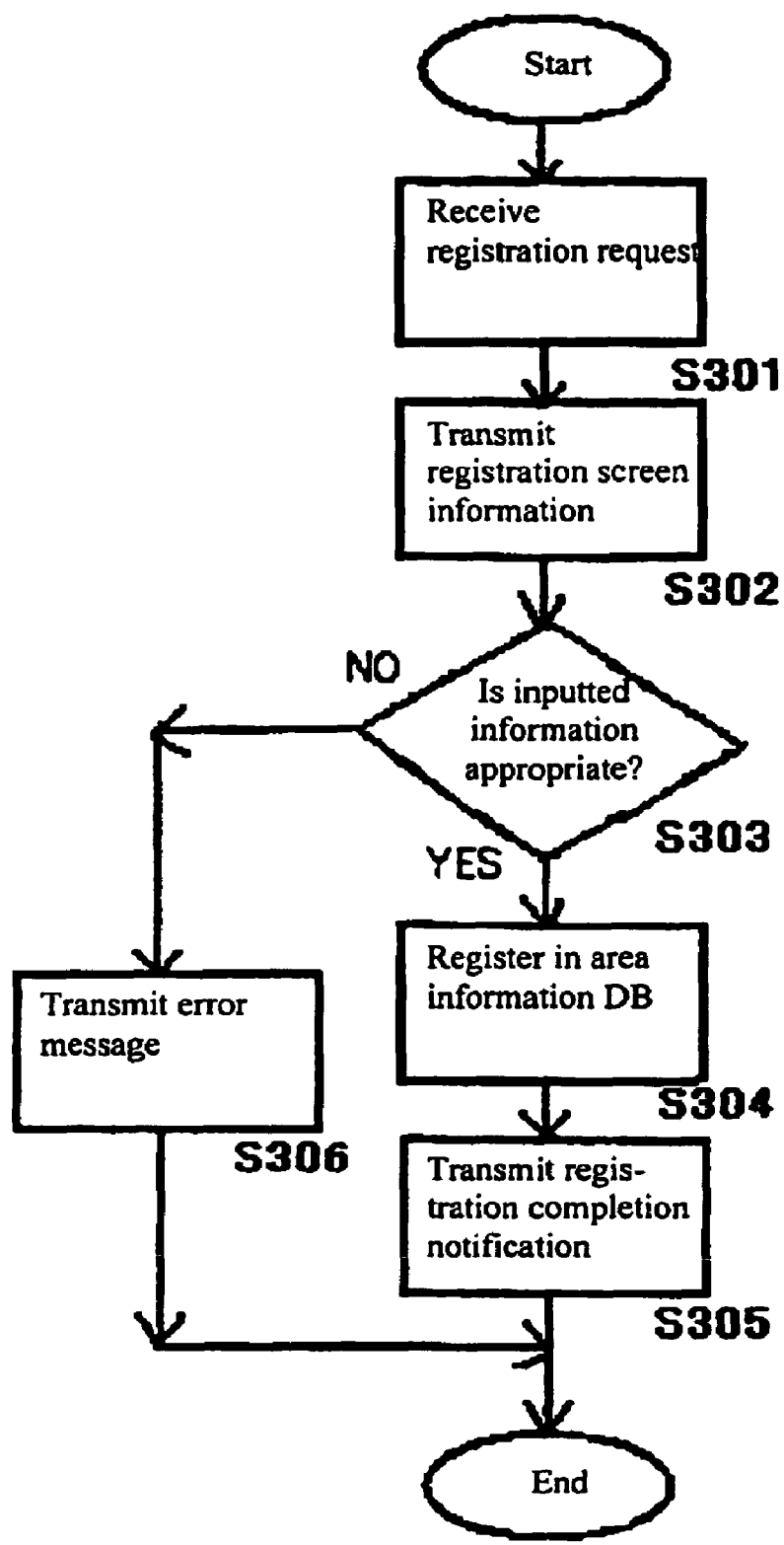

Fig. 4

| Area information registration screen | | |
|---|---|---|
| Location information | Latitude: | N35°00'00" |
| | Longitude: | E135°00'00" |
| Registration information (for the case of a store) | | |
| Store name: | | Restaurant X |
| Business hours: | | 11:00 – 25:00 |
| Regular holidays: | | Every Thursday |
| Car parking: | | 20 cars |
| Bicycle parking: | | None |
| Description text: | | An elegant restaurant serving an assortment of Japanese, Western and Chinese cuisine. Its specialty is the chef's pride — escargot. The prices are reasonable, too. |

Directions text (by car/motorcycle):
Just off National Road No. 2; turn right at the Yamada intersection Directions text (walking):
Just to the left of the Yamada exit from the Station-front underground market Directions text (by bus):
Just to the right of the Tanaka liquor store ahead of the Yamada stop Confirm    Clear

Fig. 5

Registered information (restaurant information)

| Latitude | Longitude | Store name | Business hours | Regular holidays | Car parking | Bicycle parking | Description text | Directions text |
|---|---|---|---|---|---|---|---|---|
| N34°77'00" | E134°62'00" | Restaurant X | 11:00–25:00 | Every Thursday | 20 cars | None | Elegant restaurant serving an assortment of Japanese, Western and Chinese Cuisine... | By car: National Road No. 2, Yamada... Walking: Station-front underground market Yama... By bus: Yamada stop... |
| N34°75'00" | E134°61'00" | Restaurant Y | 10:00–23:00 | Every Friday | None | 5 bicycles | The specialty is sea bream caught in Akashi... | By car: Since there is no parking.... Walking: Turn left on Station-front road... By bus: Tanaka stop... |
| N34°73'23" | E134°63'20" | Restaurant Z | 15:00–26:00 | First Thursday | 10 cars | 10 bicycles | The restaurant's specialty is fish dishes. By all means try... | By car: National Road No. 2, Tanaka... Walking: Yamada Station, north exit... By bus: Suzuki stop... |
| N34°75'00" | E134°93'00" | Restaurant A | 11:00–22:00 | Every Friday | 70 cars | 10 bicycles | Also has fresh sushi. | By car: National Road Ikenaka intersection... Walking: Station-front street... By bus: From the Asayama stop... |
| N34°70'23" | E134°81'20" | Restaurant B | 16:00–27:00 | No holidays | 10 cars | None | The chef was featured in a TV program. | By car: National Road No. 2 Yamanaka inter.... Walking: Along Kako River... By bus: From the Toyama stop... |
| . | . | . | . | . | . | . | . | . |

Registered information (tourist spot information)

| Latitude | Longitude | Spot name | Business hours | Regular holidays | Car parking | Bicycle parking | Description text | Directions text |
|---|---|---|---|---|---|---|---|---|
| N34°67'32" | E134°63'00" | Himeji Castle | 10:00–19:00 | Every Monday | 50 cars | 100 bicycles | A castle of national renown. | By car: National Road No. 2 Suzuki... Walking: From Himeji Station... |
| . | . | . | . | . | . | . | . | . |

Fig. 8

| 10 February 2003 schedule | | | |
|---|---|---|---|
| Time | Place | Content | Remarks |
| .<br>.<br>10:00<br>10:20<br>10:40<br>11:00<br>11:20<br>11:40<br>12:00<br>12:20<br>12:40<br>13:00<br>.<br>. | ──── Kyoto ────<br>↓<br>In transit<br>↓<br>Himeji<br>↓<br>Nearby restaurant<br>↓ Transit<br>Himeji Hall | <br><br><br><br><br><br><br><br>Lunch<br><br><br>Listen to lecture | <br><br><br><br><br><br><br><br><br><br><br>Lecture by Mr. ____ of University |

Fig. 11

| Acquisition date | Acquisition time | Latitude | Longitude | Estimated travel speed | Travel direction |
|---|---|---|---|---|---|
| 10 February 2003 | 10:40:20 | N34°82'22" | E135°63'89" | 210 km/h | Southwest |
| 10 February 2003 | 10:50:20 | N34°78'12" | E135°48'23" | 207 km/h | South-southwest |
| 10 February 2003 | 11:00:20 | Acquisition failed | Acquisition failed | ... | ... |
| 10 February 2003 | 11:10:19 | N34°70'89" | E134°93'78" | 185 km/h | West |
| 10 February 2003 | 11:20:20 | N34°74'50" | E134°71'00" | 179 km/h | West-southwest |
| . | . | . | . | . | . |

Fig. 12

| Location information | Travel speed (km/h) | Inferred mode of transportation |
|---|---|---|
| On expressway | ... | Car, bus, motorcycle |
| On road other than expressway | 151 or more | Car |
| | 41–150 | Car, bus, motorcycle |
| | 11–40 | Car, bus, motorcycle, bicycle |
| | 0–10 | Car, bus, motorcycle, bicycle, walking |
| On rail line | 151 or more | Shinkansen |
| | 0–150 | Electric train |
| At sea | Less than 100 | Ship |
| ... | 400 or more | Airplane |
| In facility | ... | Walking |
| Seashore/mountain path | ... | Walking |

| Station name | ... | Hikari 9876 | Kodama5432 | Nozomi1098 | Hikari1234 | ... |
|---|---|---|---|---|---|---|
| . | ... | . | . | . | . | ... |
| . | ... | . | . | . | . | ... |
| Kyoto | ... | 8:20 | 9:00 | 10:23 | 10:10 | ... |
| ShinOosaka | ... | 8:40 | 9:23 | 10:39 | 10:30 | ... |
| ShinKobe | ... | 8:55 | 9:40 | -- | 10:45 | ... |
| NishiAkashi | ... | -- | 9:58 | -- | -- | ... |
| Himeji | . | 9:25 | 10:18 | 11:18 | 11:12 | . |
| Aioi | . | 9:40 | 10:37 | -- | 11:27 | . |
| . | | . | . | . | . | . |
| . | | . | . | . | . | . |

Fig. 15

Area setting: Within a 10 kilometer radius around the set point

Fig. 16

| Current mode of transportation | Specific location information | Travelable distance |
|---|---|---|
| Car (expressway) | Next interchange | Within 5 km |
| Car (regular road) | 10 km ahead in direction of travel | Within 5 km |
| Motorcycle (regular road) | 10 km ahead in direction of travel | Within 5 km |
| Walking | Current location | Within 1 km |
| Electric train | Next stop | Within 1 km |
| Shinkansen | Next stop | Within 1 km |
| Ship | Next anchorage | Within 1 km |
| Airplane | Airport of next landing | Within 1 km |
| Bus | Next stop | Within 1 km |
| Bicycle | Current location | Within 2 km |

Fig. 17

| Lati-tude | Longi-tude | Registered information (restaurant information) | | | | | | | Area level |
|---|---|---|---|---|---|---|---|---|---|
| | | Store name | Business hours | Regular holidays | Car parking | Bicycle parking | Description text | Directions text | |
| N34° 77'00" | E134° 62'00" | Restaurant X | 11:00-25:00 | Every Thursday | 20 cars | None | Elegant restaurant serving an assortment of Japanese, Western and Chinese Cuisine... | By car: National Road No. 2, Yamada... Walking: Station-front underground market Yama... By bus: Yamada stop... | 1 |
| N34° 75'00" | E134° 61'00" | Restaurant Y | 10:00-23:00 | Every Friday | None | 5 bicycles | The specialty is sea bream caught in Akashi... | By car: Since there is no parking.... Walking: Turn left on Station-front road... By bus: Tanaka stop... | 2 |
| N34° 77'23" | E134° 63'20" | Restaurant Z | 15:00-26:00 | First Thursday | 10 cars | 10 bicycles | The restaurant's specialty is fish dishes. By all means try... | By car: National Road No. 2, Tanaka... Walking: Yamada Station, north exit... By bus: Suzuki stop... | 3 |
| .. | .. | .. | .. | .. | .. | .. | .. | .. | .. |

AREA INFORMATION PROVISION SYSTEM AND METHOD

CROSS-REFERENCE TO RELATED APPLICATIONS

This application is based upon and claims the benefit of priority from the prior Japanese Patent Application No.2003-088548, filed in Mar. 27, 2003, the entire contents of which are incorporated herein by reference.

BACKGROUND OF THE INVENTION

1. Field of the Invention

The present invention relates to a system that transmits localized information to a user's hand-held device.

2. Description of Related Art

There are well-known systems that provide users with information about relevant tourist attractions and retail stores in a given vicinity, provided that the user is within a predetermined area on the map.

In addition, there are also well-known systems that anticipate a user's likely destination and which provide information about such things as tourist attractions and retail stores in the vicinity of anticipated destinations.

For example, Japanese Patent Application Laid Open-No. 2002-82982 describes a device that automatically generates search keys based on search categories or maps selected by the user. Using these search keys, users retrieve information regarding such things as available services and facilities. Only information relevant to nearby the user's location is displayed on the user's terminal.

Japanese Patent Application Laid Open-No. 2002-41612 describes an invention that provides to users appropriate information regarding such things as retail stores and tourist attractions based on the user's trip schedule inputted in advance.

The following explains the invention described in Japanese Patent Application Laid Open-No. 2000-215211. Firstly, this invention prepares an information processing device that stores a script that lists data regarding the names, information, and locations of retail stores and the names, information, and data comparing the current location to the location of tourist attractions, as well as related information. According to whether the aforementioned script was downloaded from the aforementioned information processing device ahead of time, it displays nearby retail store and tourist attraction information on the user's terminal when the user wishes.

The following explains the invention described in Japanese Published Examined Application No. 14-257813 (2002). This invention anticipates the user's destination from the direction and speed of his or her movement. Next, Selecting from among those firms providing information regarding the anticipated destination, the invention gets only information that matches categories previously inputted by the user from the firms. Next, the invention delivers the information to the user. The category is bus information or restaurants information etc.

Japanese Patent Application Laid Open-No. 11-91570 (1999) describes an invention that, using the route and fare information of the user's mode of transportation, provides the user with information about connections at the terminal (information for boarding another vehicle in the system) or transfers (information for using other modes of transportation).

SUMMARY OF THE INVENTION

The present invention anticipates the user's mode of transportation and provides only information specific to the anticipated mode of transportation. Through this the user's burden is minimized, only the appropriate information is presented and, thus, the problems identified above are solved.

Using geographic information, information about the user's current location and information about the user's schedule contained in the user's portable terminal, the present invention anticipates the user's mode of transportation. Next, using the user's anticipated mode of transportation, geographic information and transportation timetables, the present invention anticipates the locations at which it would be desirable to provide specific information. Furthermore, the present invention is unique in providing the user with information obtained from a database specific only to the area of the user's anticipated location and mode of transportation.

Using the present invention, the user can obtain desired "area information" without having to select or input various kinds of prompting information. In addition, by anticipating the user's mode of transportation, the present invention can anticipate the possible locations at which the user may stop. Thus it is possible to stop the receipt and transmission of information pertaining to locations at which the user cannot stop.

In one embodiment of the present invention, a system for providing area information comprises a first information processing device operable to transmit at least one item of area specific information and a second information processing device operable to receive the at least one item of area specific information, wherein the first information processing device comprises a storage unit operable to store area specific information and corresponding location information in pairs, an inference unit operable to infer a mode of user transportation based on location information of a user of the second information processing device, an extraction unit operable to extract at least one item of area information specific to the mode of user transportation from the storage unit, and a transmission unit operable to transmit the at least one item of area information extracted by the extraction unit to the second information processing device, and wherein the second information processing device comprises a receiving unit operable to receive the at least one item of area information from the first information processing device.

In one aspect of the present invention, the inference unit is alternately operable to infer a mode of user transportation based on schedule information of a user of the second information processing device. The inference unit is further operable to infer a mode of user transportation based on schedule information of a user of the second information processing device, the schedule information contained in the second information processing device.

In one aspect of the present invention, the inference unit is further operable to infer a mode of user transportation based on schedule information of a user of the second information processing device. The inference unit is further operable to infer a mode of user transportation based on schedule information of a user of the second information processing device, the schedule information contained in the second information processing device.

BRIEF DESCRIPTION OF THE DRAWINGS

FIG. 3 is a flow chart indicating the processing of area information registration in an embodiment of this invention.

FIG. 4 is an example of an area information registration screen in an embodiment of this invention.

FIG. 5 is an example of a database that includes area information in an embodiment of this invention.

FIG. 8 is a diagram showing a user's schedule info in an embodiment of this invention

FIG. 11 is an example of an information log in an embodiment of this invention.

FIG. 12 is an example of estimated data in an embodiment of this invention.

FIG. 15 is an example of settings data in an embodiment of this invention.

FIG. 16 is an example of filtered data in an embodiment of this invention.

FIG. 17 is an example of a database containing area level fields in an embodiment of this invention.

DETAILED DESCRIPTION OF THE INVENTION

With the conventional technologies described above prior art, the user hardly obtain the specific information he or she desired without first having prompted the provider system with large quantities of information.

The above Japanese Published Examined Application No. 14-257813 (2002) describes an invention that estimates the user's rate of travel and specifies the user's destination, based on the user's position. However, after the user's destination had been identified, the user had to select and input into the provision system the category attributes of the information the user desired.

Moreover, the above Japanese Patent Application Laid Open-No. 11-91570 (1999) is a system that anticipates places of stopping and sends to the user's terminal information about forward transportation routes, based on user fares and route information. However, for those users that did not require route information, this was useless information.

Furthermore, when traveling to a destination via an indirect route requiring transfer between various modes of transportation, this system is problematic because it does not enable the user to obtain the appropriate information without entering the mode of transportation and destination at each point of transfer. Using the present invention, the user can obtain the desired specific information without having to select or input various kinds of prompting information. In addition, by anticipating the user's mode of transportation, the present invention can anticipate the possible locations at which the user may stop. It is possible to stop transmitting of useless information.

Figure 1:
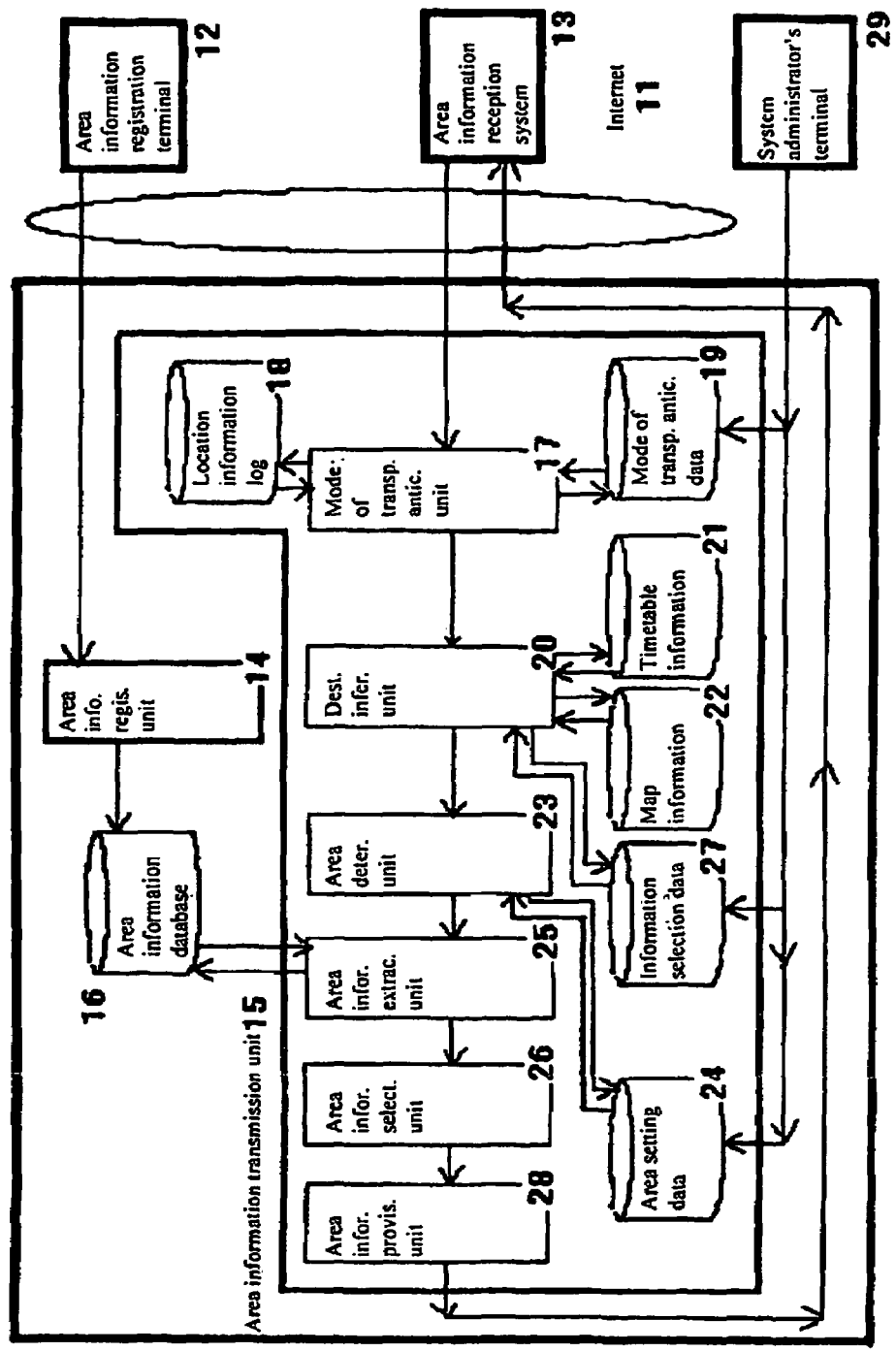
FIG. 1 is a block diagram of the area information transmission system in an embodiment of this invention.
Figure 2:
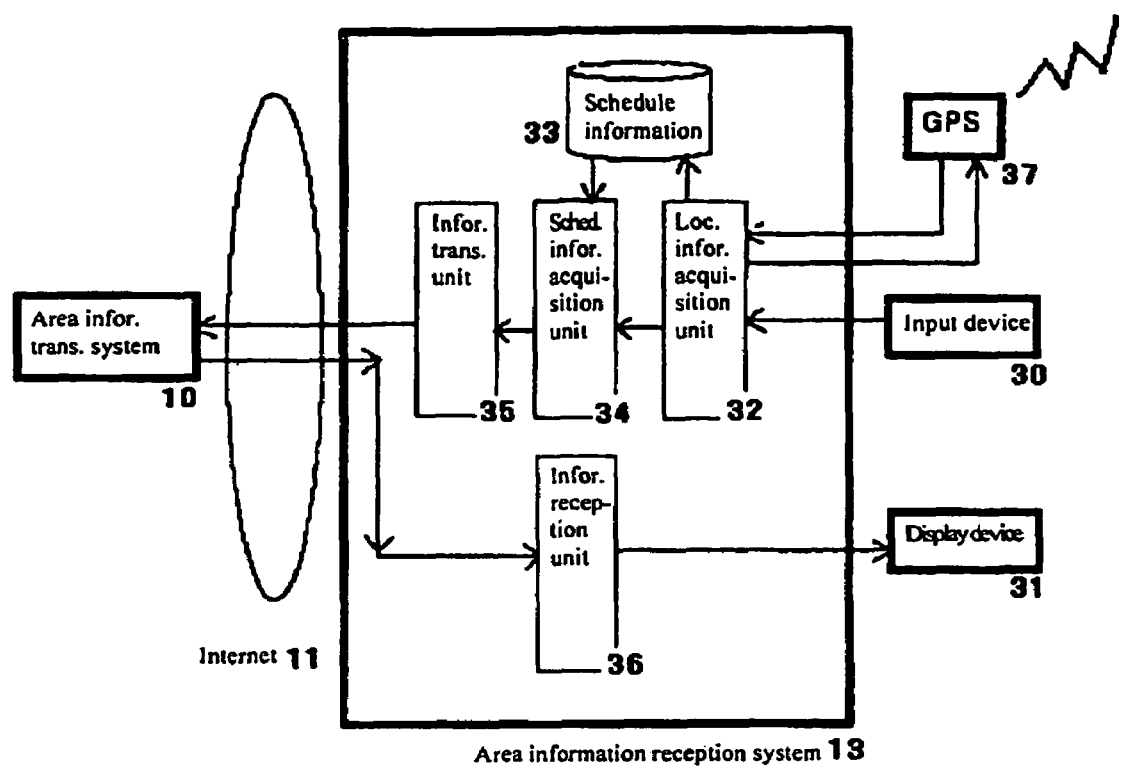
FIG. 2 is a block diagram of the area information reception system in an embodiment of this invention.

With reference to the technical drawings, the following describes an embodiment of the present invention. FIG. 1 is a diagram describing the configuration of the area information transmission system by which area information is transmitted. FIG. 2 is a diagram describing the configuration of the area information reception system by which area information is received.

In order to allow for the reception and transmission of data, the area information transmission system 10 in FIG. 1 is connected via the internet 11 to area information reception system 13 and, for the purposes of registering for area information, to area information registration terminal 12. In addition, it is also connected to the system administrator's terminal 29 in order to allow for the transmission and reception of data.

Area information is information specific to a given area. For example, if we let city A be the area, then area information is information relevant to such things restaurant information, tourist attraction information, building structure information, transportation system information, shopping facility information, medical facility information, sports facility information, education facility information, road information, and weather information in city A.

Area information registration terminal 12 is the terminal by which area information is registered in area information database 16. Using area information registration terminal 12, the system administrator of area information transmission system 10 and/or information providers register area information.

Area information reception system 13 is an information processing device that receives area information from area information transmission system 10. In concrete terms, area information reception system 13 is equivalent to portable processing devices such as the user's cellular phone or notebook computer.

Area information transmission system 10 consists of area information registration unit 14, area information transmission unit 15, and area information database 16.

Area information registration unit 14 receives and registers in database 16 area information such as information relevant to retail outlets and tourist attractions inputted from area information registration terminal 12.

Area information transmission unit 15 consists of transportation mode anticipation unit 17, destination anticipation unit 20, area determination unit 23, area information extraction unit 25, area information selection unit 26, and area information provision unit 28, as well as location information log 18, transportation mode anticipation data 19, timetable information 21, map information 22, area settings data 24 and information selection data 27.

Transportation mode anticipation unit 17 anticipates the information reception system 13 user's mode of transportation. Modes of transportation are anticipated based on location information log 18, transportation mode anticipation data 19 and positioning and scheduling information sent from area information reception system 13.

Destination anticipation unit 20 anticipates the information reception system 13 user's destination point. Destination points are anticipated based on timetable information 21, map information 22, positioning and scheduling information sent from area information reception system 13 and modes of transportation anticipated by transportation mode anticipation unit 17.

Using area settings data 24, area determination unit 23 determines the areas within which destination points anticipated by destination anticipation unit 20 are located.

Area information extraction unit 25 obtains from area information database 16 information included within the area determined by area determination unit 23.

Area information selection unit 26 selects from area information obtained by area information extraction unit 25 the area information specific to the modes of transportation anticipated by transportation mode anticipation unit 17. The selection of information is based on information selection data 27, the transportation mode anticipated by transportation mode anticipation unit 17 and positioning and scheduling information sent from area information reception system 13.

Area information provision unit 28 transmits to area information reception system 13 the area information selected by area information selection unit 26.

Area information database 16 stores area information received by area information registration unit 14 from area information registration terminal 12.

Location information log 18 stores area information reception system 13 user's location information obtained by transportation mode anticipation unit 17. An example of location information log 18 is shown in FIG. 11.

Transportation mode anticipation data 19 is data used in anticipating the location of the user of area information reception system 13. An example of transportation mode anticipation data 19 is shown in FIG. 12.

As shown in FIG. 12, information regarding location, rate of movement, and mode of transportation is registered as a set.

Figures 13, 14:
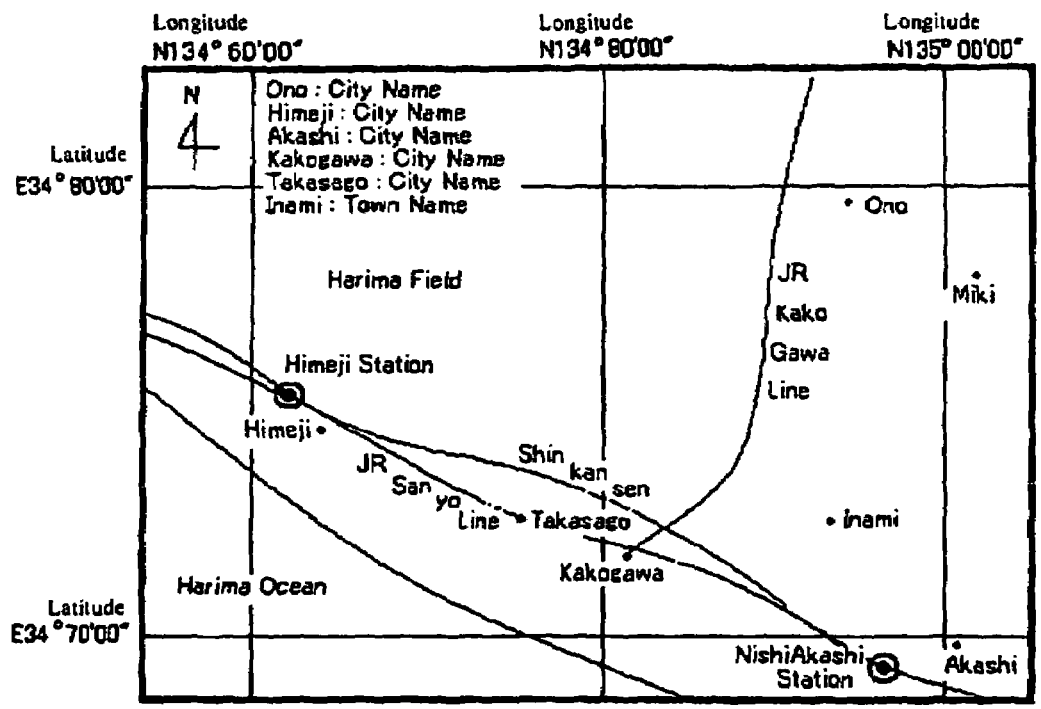
FIG. 13 is an example of a timetable information in an embodiment of this invention.
FIG. 14 is an example of map information in an embodiment of this invention.

Timetable information 21 is time schedule information regarding various transportation systems. An example of timetable information 21 is shown in FIG. 13.

Map information 22 is a database of maps containing information about such things as several transportation systems and municipality names. A portion of map information 22, similar to the information found in car navigation systems, is shown in FIG. 14 as an example.

Area settings data 24 describes the criteria used for the purposes of establishing areas. An example of area settings data 24 is shown in FIG. 15. As FIG. 15 indicates, an area is defined as a circle within a ten-kilometer radius of an established point.

Information selection data 27 describes the criteria used to select area information depending upon specific information pertaining to various modes of transportation. An example of information selection data 27 is shown in FIG. 16.

System administrator terminal 29 is the terminal used by the administrator of area information transmission system 10. Using system administration terminal 29, the system administrator registers and modifies single or multiple items consisting of transportation mode anticipation data 19, area settings data 24, and information selection data 27.

FIG. 2 shows the configuration of the area information provision system's area information reception system 13. In order to allow for the reception and transmission of data, area information reception system 13 is connected via the internet 11 to area information transmission system 10.

Area information reception system 13 is also connected to input device 30, display unit 31 and GPS 37 in order to allow for the reception and transmission of data. Area information reception system 13 consists of location information acquisition unit 32, schedule information acquisition unit 34, information transmission 35, information reception unit 36 and schedule information 33.

Via GPS 37, location information acquisition unit 32 obtains information regarding the current location of the user of area information reception system 13. Schedule information acquisition unit 34 obtains schedule data from schedule information 33 of the user of area information reception system 13.

Information transmission unit 35 sends the position information obtained by position information acquisition unit 32 and the schedule information obtained by schedule information acquisition unit 34 to area information transmission system 10.

Information reception unit 36 receives the area information sent from area information transmission system 10 and displays it on display device 31.

Next, the flow of the processing of area information registration unit 14 inside area information transmission system 10 will be explained with reference to FIG. 3.

Step S301 is a step in which area information registration unit 14 receives a request for the purpose of registering area information from area information registration terminal 12.

Step S302 is a step in which area information registration unit 14 sends a screen for the purpose of registering area information to area information registration terminal 12. An example of this screen is shown in FIG. 4.

Step S303 is a step in which area information registration unit 14 assesses whether or not the area information items inputted from area information registration terminal 12 are appropriate. The system proceeds to Step S304 in the case in which the area information items are appropriate, and proceeds to Step S306 in the case in which they are not appropriate.

Step S304 is a step in which area information registration unit 14 registers the area information inputted from area information registration terminal 12 in area information database 16. An example of area information database 16 is shown in FIG. 5.

Area information database 16 consists of a latitude field, a longitude field, and a registration information field. Furthermore, the registration field consists of the following subfields: a store name field, a business hours field, a regular holidays field, a parking lot field, a bicycle parking lot field, an introductory statement field, and a guide statement field.

The latitude field consists of multiple items that show the latitude of the store. The longitude field consists of multiple items that show the longitude of the store. The store name field consists of multiple items that show the store name.

The business hours field consists of multiple items that show the business hours of the store. The regular holidays field consists of multiple items that show the regular holidays of the store. The parking lot field consists of multiple items that show whether or not the store has parking lot spaces. The bicycle parking lot field consists of multiple items that show whether or not the store has space in which one could park a bicycle. The introductory statement field consists of multiple items that show the introductory statement of the store. The guide statement field consists of multiple items that show the guide statement of the store.

Moreover, the registration information field of area information database 16 may consist of a field that stores information that displays the telephone number, information that displays the homepage URL, information that displays a detailed map, information that shows whether or not transportation is provided by a vehicle of the facility, information that shows the menu provided by the facility, information that shows the number of personnel the facility can accommodate, information that shows whether or not there is a Braille menu in the facility, information that shows whether or not there is someone that is capable of sign language in the facility, or information that shows whether or not guide dogs are permitted.

Step S305 is a step in which area information registration unit 14 sends information indicating that registration into area information database 16 is complete to area information registration terminal 12.

Step S306 is a step in which area information registration unit 14 sends an error message to area information registration terminal 12. The above is a description of the flow of the process in which area information registration unit 14 registers area information in area information database 16.

Figure 6:
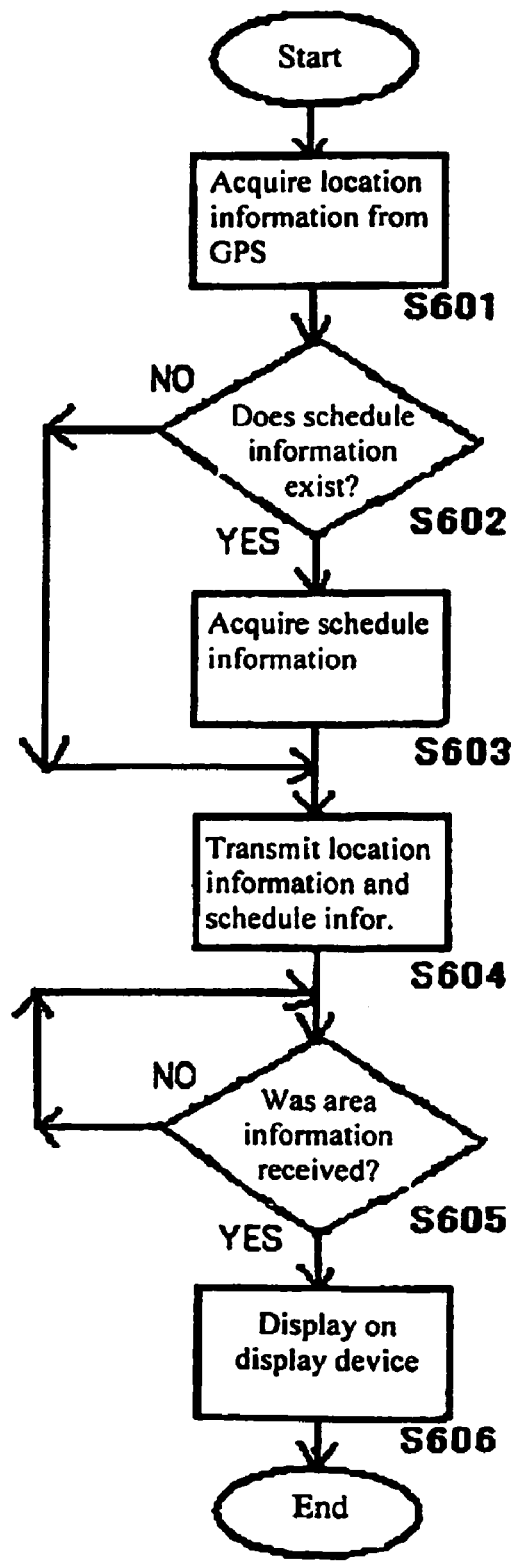
FIG. 6 is a flow chart indicated the processing of received area information in an embodiment of this invention.

Next, the flow of the process in which the user receives area information from area information transmission system 10 using area information reception system 13 will be explained with reference to FIG. 6.

Figure 7:
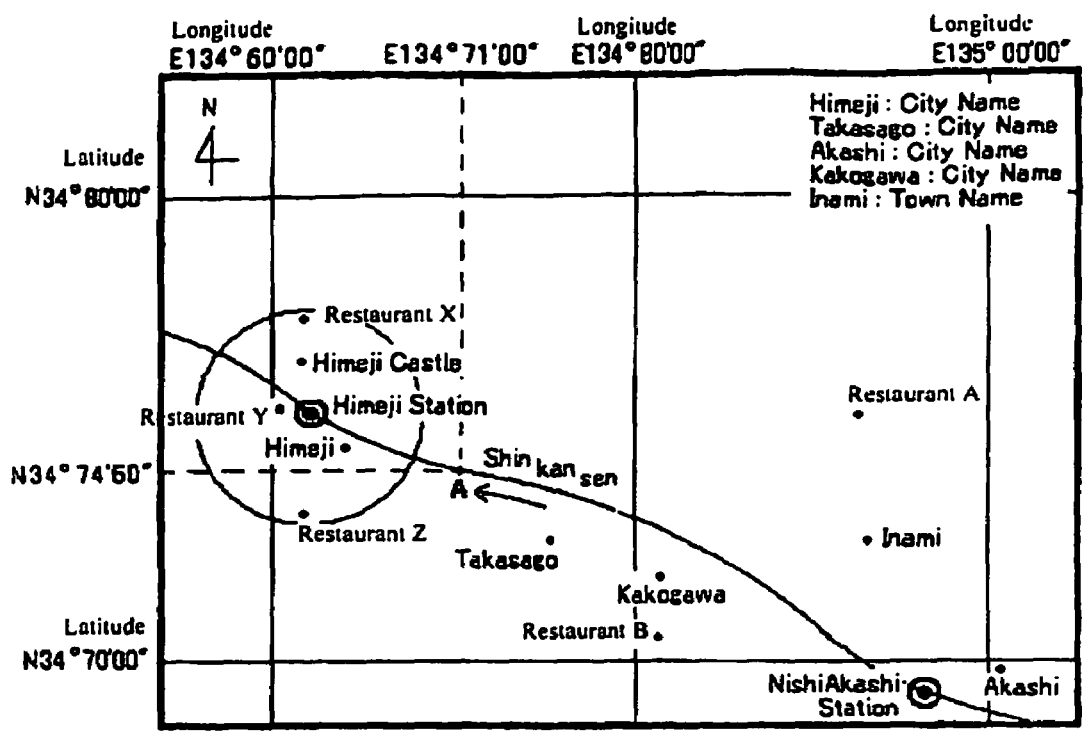
FIG. 7 is a diagram indicating location of a user in an embodiment of this invention.

Step S601 is a step in which position information acquisition unit 32 acquires the current position information of area information reception system 13 using GPS 37. For example, if point A in FIG. 7 is the current location of the user of area information reception system 13, then position information acquisition unit 32 obtains the information, "Latitude: N34° 74' 50", Longitude: E134° 71' 00"," from GPS 37. In this example, the current position information is obtained using GPS, but the current position information may also be obtained using a portable terminal or PHS.

Moreover, as a request to receive area information, a smart pull model in which area information reception system 13 independently sends an acquisition request to area information transmission system 10 is used in this embodiment. With this smart pull model, it not necessary for the user to consciously send a request for position information acquisition.

However, a pull model in which the user inputs an area information acquisition request from area information reception system 13 when the user wants area information may also be used. Moreover, a push model in which area information transmission system 10 independently sends area information to area information reception system 13 without the user of area information reception system 13 sending a request would also be acceptable.

Step S602 is a step in which schedule information acquisition unit 34 investigates whether or not there is information after the current time in schedule information 33 of the user of area information reception system 13. If there is information after the current time in schedule information 33, the system proceeds to Step S603, and if there is no schedule, it proceeds to S604. An example of schedule information 33 is shown in FIG. 8.

Step S603 is a step in which schedule information acquisition unit 34 obtains schedule information after the current time from schedule information 33. If the schedule information in which the schedule for the day appears is as shown in FIG. 8, then "Time: 11:20, Location; Moving, Time; 11:40, Location; Himeji (Himeji: city name), Time; 11:40 to 12:40, Content; Lunch" is obtained as the schedule information after the current time, 11:20 on Feb. 10, 2003.

Step S604 is a step in which information transmission unit 35 sends the position information obtained in Step S601 and the schedule information obtained in Step S603 to area information transmission system 10. It is also possible to equip area information reception system 13 with a device for detecting movement speed, and also to send the moving speed information to area information transmission system 10.

Step S605 is a step in which information reception unit 36 receives information from area information transmission system 10.

Figure 9:
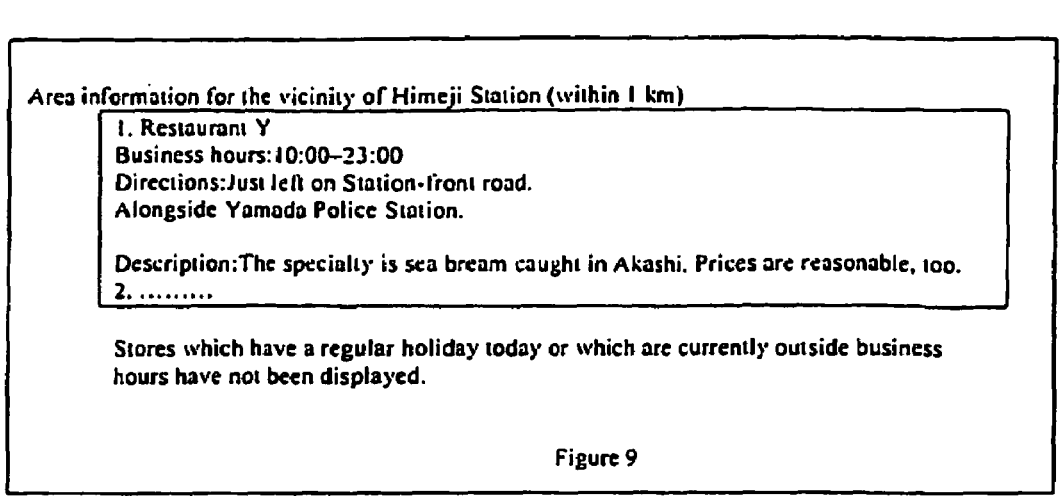
FIG. 9 is a diagram showing a display screen of the area information reception system in an embodiment of this invention.

Step S606 is a step in which information reception unit 36 displays the area information received Step S605 on display device 31. FIG. 9 shows the state in which the area information is displayed on display device 31. The above is a description of the flow of the process in which the user receives area information using area information reception system 13.

Figure 10:
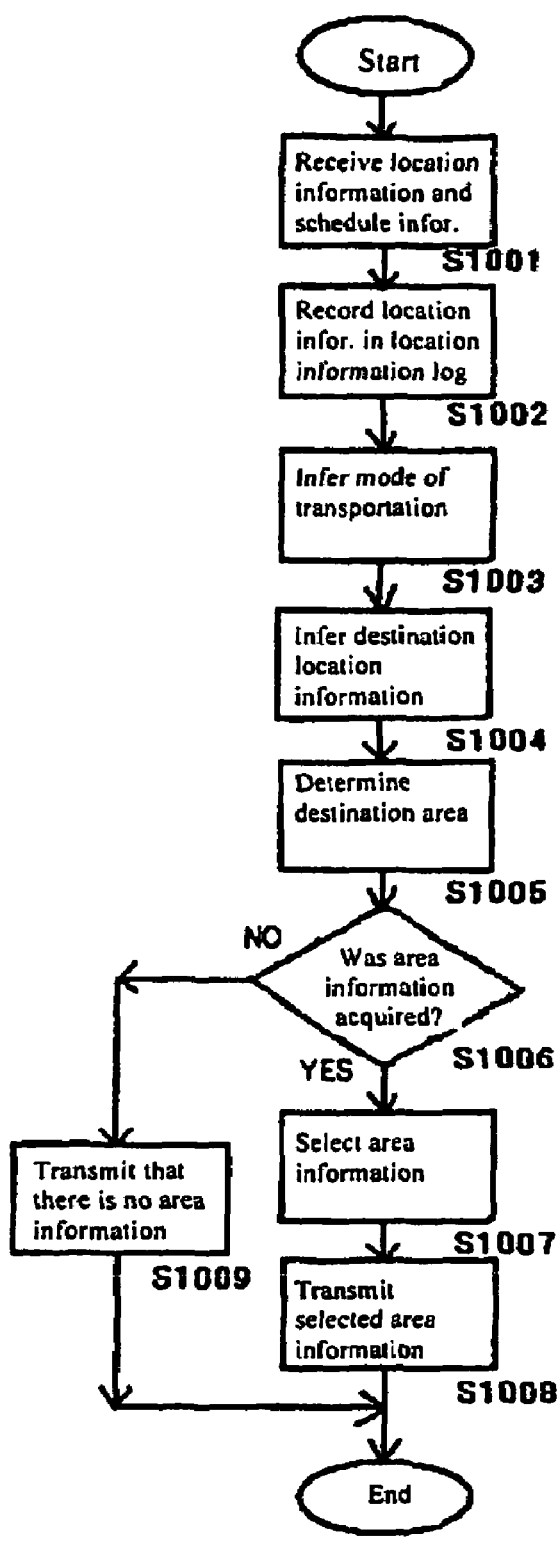
FIG. 10 is a flow chart indicating the processing flow of the area information transmission system in an embodiment of this invention.

Next, the flow of the process in which area information transmission system 10 sends area information to area information reception system 13 will be explained with reference to FIG. 10.

Step S1001 is a step in which mode of transportation estimation unit 17 receives position information and area information from area information reception system 13. An example in which the user of area information reception system 13 is located at point A in FIG. 7 and the schedule information of the user is as shown in FIG. 8 will be shown next. In this case, the information received by mode of transportation estimation unit 17 is, "Latitude: N34° 74' 50", Longitude: E134° 71' 00"; Schedule: Time: 11:20, Location; Moving, Time; 11:40, Location; Himeji (Himeji: city name), Time; 11:40 to 12:40, Content; Lunch." In the case in which area information reception system 13 is equipped with a device for detecting movement speed, the movement speed is also received during this step.

In Step S1002, mode of transportation estimation unit 17 uses the position information received in Step S1001 and the current time to estimate the movement speed and movement direction. Upon doing so, it records the position information, the current time, the estimated movement speed, and the estimated movement direction in position information log 18. An example of position information log 18 is shown in FIG. 11.

Giving an example of movement speed estimation, if the immediately preceding longitude is X1, the current longitude is X2, the immediately preceding latitude is Y1, the current latitude is Y2, the immediately preceding time is T1, and the current time is T2, then movement speed S is found by dividing the movement distance D by (T2-T1). Moreover, movement distance D is found by taking the square root of the sum of the square of (X1-X2) and the square of (Y1-Y2).

Step S1003 is a step in which mode of transportation estimation unit 17 estimates the mode of transportation of the user. Mode of transportation estimation is performed based on the position information and schedule information received in Step S1001, and movement speed and movement direction estimated in Step S1002, the movement device estimation data 19, and the timetable information 21.

The case in which the user is located at point A in FIG. 7 will be explained. In this case, the movement speed estimated to be 179 km/h in Step S1002 is collated with the longitude, latitude, and map information 22, and it is thereby understood that the position is on the railway. By comparing these to mode of transportation anticipation data 19, it is possible to estimate that the mode of transportation of the user is the Shinkansen bullet train. It then obtains the time table of the Shinkansen from timetable information 21, collates the obtained Shinkansen time table and the corresponding location, and estimates that the name of the Shinkansen train that the user is riding is "Hikari 1234."

An example of mode of transportation estimation data 19 is shown in FIG. 12. Next, an example of the mode of transportation estimation will be given. If the user is located on the highway, it is estimated that the mode of transportation is a car, bus, or motorcycle, and if the movement speed is 400 km/h or greater, it estimates that the mode of transportation is an airplane, regardless of the location.

Moreover, by using the longitude and latitude information recorded in position information log 18, it is possible to more accurately understand the position for the purpose of estimating the mode of transportation. For example, if the past longitude and latitude information is always in agreement with the route of the Shinkansen, then it is possible to determine that the position of the user is on the Shinkansen train tracks.

Registration and changes of the multiple items that constitute mode of transportation estimation data 19 can be performed by the administrator of area information transmission system 10 by using system administrator terminal 29. Step S1004 is a step in which destination estimation unit 20 estimates the destination of the user, which is one piece of information that is particular to the mode of transportation. Destination estimation is performed based on the position information received in Step S1001, the mode of transportation—"Hikari 1234"—estimated in Step S1003, information selection data 27, timetable information 21, and map information 22.

It was estimated in Step S1003 that the mode of transportation of the user located at point A in FIG. 7 is a Shinkansen with the train name "Hikari 1234." Using information selection data 27 shown in FIG. 16, the "Next Station" is obtained as position information particular to the Shinkansen. Furthermore, by using timetable information 21, the next station, "Himeji Station," is obtained as position information particular to the mode of transportation of the user.

Moreover, schedule information 33 may be used to estimate that the user will get off the train at Himeji Station and estimate the destination of the user to be "Himeji Station."

Furthermore, by collating the user position information and map information 22, it is possible for destination position estimation unit 20 to assess whether the user has performed activities that differ from the schedule information.

In this case, destination position estimation unit 20 is able to obtain the "Next Station," "Bus Stop/Depot," "Service Station," or "Rest Area," as position information particular to the mode of transportation by using information selection data 27 and timetable information 21. An example of timetable information 21 is shown in FIG. 13. Moreover, an example of information 22 is shown in FIG. 14.

Next, another example of information particular to the mode of transportation will be shown. For example, if it is estimated by mode of transportation estimation unit 19 that the mode of transportation is an airplane, it is possible to estimate the next airport at which the plane will land by determining the flight number from the airplane time table and position information. For example, if it is estimated from the estimation data that the mode of transportation is a ship, then the next port on the timetable at which the ship will be anchored is estimated by determining the ship name from the ship timetable and the position information. Likewise, if it is estimated from the estimation data that the mode of transportation is a bus, then the destination is estimated to be the next bus stop on the time table by determining the bus time table and bus number.

If it is estimated from mode of transportation estimation data 19 that the mode of transportation is a car on the highway, then the next service station or interchange is estimated as the destination from the movement direction. If it is estimated that the means of transportation is foot, then the vicinity of the current position becomes the particular movement position.

Step S1005 is a step in which area determination unit 23 determines the area containing the destination position particular to the mode of transportation estimated in Step S1004 by using area setting data 24. In FIG. 15, which shows area setting data 24, the area is "Within a 10-kilometer radius of the designated point." Therefore, the 10-kilometer circumference around Himeji Station, which is the destination estimated in Step S1004, is established as the area.

Moreover, autonomous body segmentation such as "within the city limits" or "within the town limits," or classifications such as "school district" may be registered in area setting data 24 to the extent provided by the organization. It is possible for the administrator of area information transmission system 10 to register or change the multiple items that constitute area setting data 24 with system administrator terminal 29.

Step S1006 is a step in which the area information extraction unit 25 extracts area information for the area determined in step S1005 from the area information database 16. The area information database 16 is searched for information on restaurants within a radius of 10 kilometers around "Himeji Station", which is the destination inferred in step S1004, using "lunch", which was contained in the schedule information 33, as the key. "Restaurant X", "Restaurant Y" and "Restaurant Z" are acquired as a result. For the acquisition, longitude and latitude data constituting the location information of the destination of "Himeji Station" and the location information of the various data items contained in the area information database 16 are used.

The locational relationships of the stores contained in the area information database 16 are shown in FIG. 7.

Here, the inside of the circle centered around "Himeji Station" corresponds to the area.

Step S1007 is a step in which the area information selection unit 26 selects mode of transportation specific information from the area information extracted in step S1006. This selection processing is carried out based on information selection data 27. An example of information selection data 27 can be found in FIG. 16, where "mode of transportation", "specific locational information" and "travelable distance" are registered in pairs.

The user located at location A in FIG. 7 was inferred in step S1003 to be traveling by Shinkansen, so "Next Station" and "within 1 km" is acquired as the Shinkansen-specific information.

Then, information on "Restaurant X, "Restaurant Y" and "Restaurant Z", which is the area information extracted in step S1006, is compared against the parameter of "Within 1 km", which is the travelable distance acquired from the information selection data 27 shown in FIG. 16.

Using the parameters of information selection data 27, the area information selection unit 26 selects "Restaurant Y", which is considered to be appropriate if the mode of transportation is a Shinkansen. The items making up the information selection data 27 can be registered and modified by the administrator of the area information transmission system 10 from the system administrator's terminal 29.

With this area information selection unit 26, for a user whose mode of transportation is a car on an expressway, stores within 5 km of the next interchange can be displayed. Furthermore, it is possible to include a function whereby stores that have no car parking spaces will not be displayed if the mode of transportation is a car.

Step S1008 is a step in which the area information provision unit 28 transmits the information selected in step S1007 to the area information reception system 13. The "walking" content (information for people walking to the store) is selected from the directions text field of "Restaurant Y" contained in the area information database 16, and is transmitted to the area information reception system 13. A user whose mode of transportation is the Shinkansen will not be able to use "Restaurant Y" unless he detrains at Himeji Station, so the "walking" content is selected. The preceding is the flow of the processing whereby the area information transmission system 10 transmits area information to the area information reception system 13.

This series of processing makes it possible for the user of the area information reception system 13 to receive information on his or her destination that is appropriate for his or her mode of transportation.

Furthermore, in the area information database 16, it is also possible to classify into levels by distance from a facility and provide an area level field made up of those levels, and control the transmission of information based on the distance between a user and a store. For example, if there are stores within less than 100 m of the user's location, then when notifying a user of the store information, the area level is taken to be 1. If there are stores from 100 m to less than 200 m from the user's location, then when notifying the user of the store information, the area level is taken to be 2. If there are stores from 200 m to less than 300 m from the user's location, then when notifying the user of the store information, the area level is predetermined to be 3.

In FIG. 17, which illustrates an area information database 16 provided with an area level field, "Restaurant X" has area level 1, "Restaurant Y" has area level 2 and "Restaurant Z" has area level 3.

Figure 18:
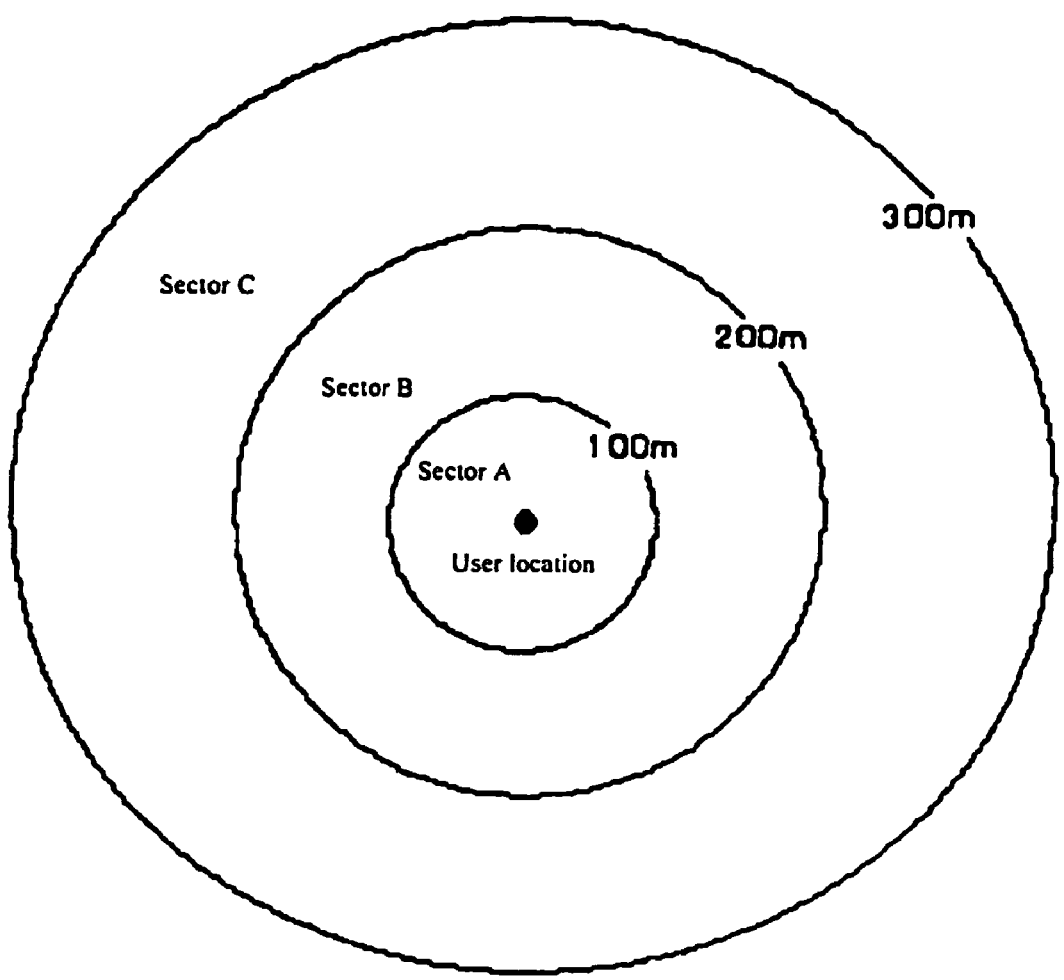
FIG. 18 is a schematic diagram of information transmission corresponding to the user's distance in an embodiment of this invention.

In FIG. 18, if "Restaurant X" is located in sector A, no more than 100 m from the user, then information on "Restaurant X" will be transmitted to the user, but would not be transmitted if the restaurant was located in sector B or sector C. Similarly, if "Restaurant Y" is located in sector B, which is from 100 to less than 200 m from the user, then information on "Restaurant Y" will be transmitted to the user, but would not be transmitted if the restaurant was located in sector A or sector C. If "Restaurant Z" is located in sector C, which is from 200 to less than 300 m from the user, then information on "Restaurant Z" will be transmitted to the user, but would not be transmitted if the restaurant was located in sector A or sector B.

This makes it possible to transmit information according to the distance from the user. This can also be used when the mode of transportation cannot be inferred.

Implementation is also possible by installing the program, which enables the functions of the above mode of embodiment in individual information devices, and enabling those functions in those information devices.

We claim:

1. A system for providing area information comprising:
   a first information processing device to transmit at least one item of area information; and
   a second information processing device to receive the at least one item of area information;
   wherein the first information processing device comprises:
      a first storage unit to store area information including location information,
      a second storage unit to store mode of transportation and specific location information corresponding to mode of transportation in pairs,
      a receiving unit to receive location information of a user from the second information processing device,
      an inference unit to infer a mode of user transportation based on the received location information of a user of the second information processing device,
      a destination estimation unit operable to estimate a next stop of the mode of user transportation based on the specific location to the inferred mode of user transportation in the second storage unit, the inferred mode of user transportation, and the received location information of a user of the second information processing device,
      an extraction unit to extract at least one item of area information specific to the estimated next stop of the mode of user transportation from the first storage unit, and
      a transmission unit to transmit the at least one item of area information extracted by the extraction unit to the second information processing device; and
   wherein the second information processing device comprises:
      a receiving unit to receive the at least one item of area information from the first information processing device.

2. The system of claim 1, wherein the inference unit alternately operable to infer a mode of user transportation based on schedule information of the user of the second information processing device.

3. The system of claim 2, wherein the inference unit further infers a mode of user transportation based on schedule information of the user of the second information processing device, the schedule information contained in the second information processing device.

4. The system of claim 1, wherein the inference unit further infers a mode of user transportation based on schedule information of the user of the second information processing device.

5. The system of claim 4, wherein the inference unit further infers a mode of user transportation based on schedule information of the user of the second information processing device, the schedule information contained in the second information processing device.

6. A method for providing area information comprising the steps of:
   storing area information including location information in a first storage unit,
   storing mode of transportation and specific location information corresponding to the mode of transportation in pairs in a second storage unit,
   receiving location information of a user from an information processing device,
   inferring a mode of user transportation based on the received location information of a user of the information processing device,
   estimating a next stop of the mode of user transportation based on the specific location corresponding to the inferred mode of user transportation in the second storage unit, the inferred mode of user transportation, and the received location information of a user of the second information processing device,
   extracting at least one item of area information specific to the estimated next stop of the mode of user transportation from the first storage unit, and
   transmitting the at least one item of area information extracted by the extraction unit to the information processing device.

7. The method of claim 6, wherein a mode of user transportation is inferred based on schedule information of a user of an information processing device.

8. The method of claim 7, wherein the schedule information is stored in the information processing device.

9. The method of claim 6, further comprising the step of:
   inferring a mode of user transportation based on schedule information of the user of the information processing device.

10. The method of claim 9, wherein the schedule information is stored in the information processing device.

11. A computer readable storage medium storing a program for providing area information, the program causing a computer to function with:

storing area information including location information in a first storage unit, storing mode of transportation and specific location information corresponding to mode of transportation in pairs in a second storage unit, receiving location information of a user from an information processing device, inferring a mode of user transportation based on the received location information of a user of the information processing device, estimating a next stop of the mode of user transportation based on the specific location corresponding to the inferred mode of user transportation in the second storage unit, the inferred mode of user transportation, and the received location information of a user of the second information processing device, extracting at least one item of area information specific to estimated next stop of the mode of user transportation from the first storage unit, and transmitting the at least one item of area information extracted by the extraction unit to the information processing device.

12. The computer readable storage medium of claim 11, wherein a mode of user transportation is inferred based on schedule information of a user of an information processing device.

13. The computer readable storage medium of claim 12, wherein the schedule information is contained in the information processing device.

14. The computer readable storage medium of claim 11, wherein the program further performs the step of:

inferring a mode of user transportation based on schedule information of the user of the information processing device.

15. The computer readable storage medium of claim 14, wherein the schedule information is contained in the information processing device.

* * * * *